Feb. 22, 1938.   R. S. PEIRCE   2,108,942
TAMPERPROOF SEAL AND METHOD OF PRODUCTION
Filed March 13, 1935   2 Sheets-Sheet 1

Inventor
Ralph S. Peirce
By: A. Trevor Jones   Atty.

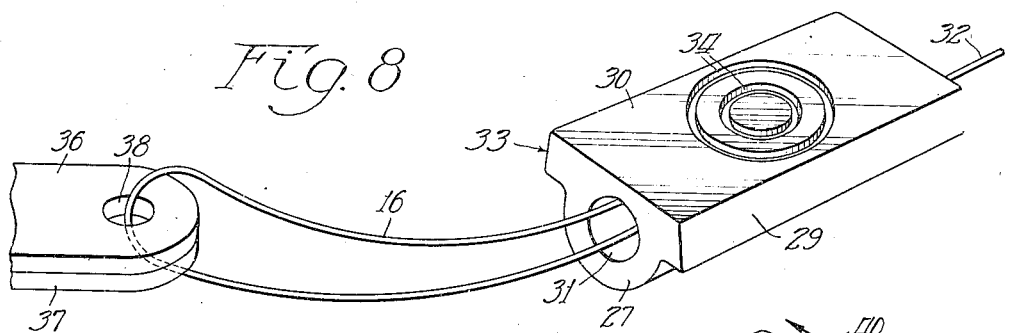
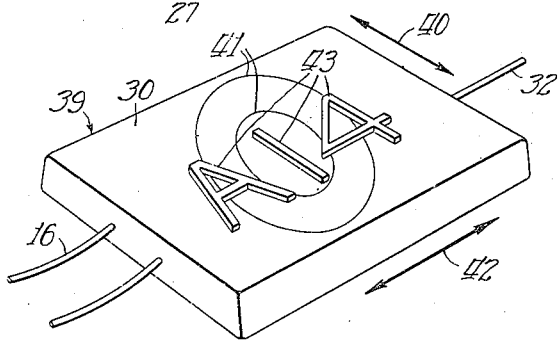
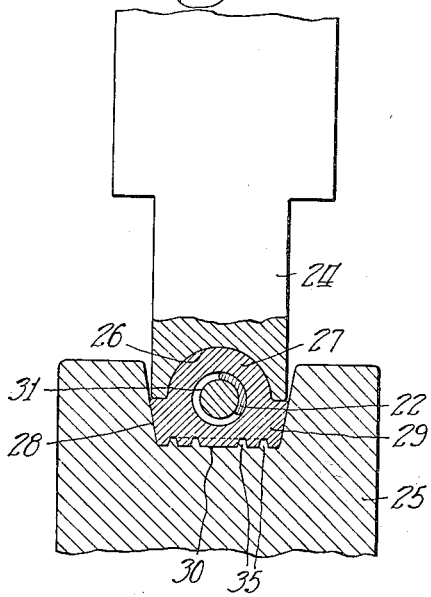
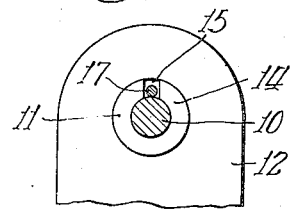
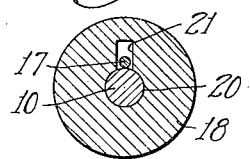

Patented Feb. 22, 1938

2,108,942

UNITED STATES PATENT OFFICE 2,108,942

TAMPERPROOF SEAL AND METHOD OF PRODUCTION

Ralph S. Peirce, Hinsdale, Ill.

Application March 13, 1935, Serial No. 10,775

6 Claims. (Cl. 40—2.2)

This invention relates to tamper-proof seals or the like and method of production.

Particularly on gas and electric service meters, for example, which are intended to be sealed against unlawful access, it is important that the seals not only be such that they cannot be removed and replaced without being broken, but also that unauthorized or so-called "bootleg" seals be not substituted for the original seal after the first has been destroyed and unauthorized access had to the meter.

Among other objects, my invention aims to provide an improved seal and method of producing the same which meets both of these requirements and which can be produced in large quantities at extremely small individual cost.

The invention will be understood by reference to the accompanying drawings illustrating one form of seal made in accordance with my invention and illustrative expedients for producing same in accordance with the method of my invention.

In the drawings, Figure 1 is a fragmentary view of simple but practical expedients, parts being shown in section, for practicing a preferred early step in my invention, the expedients being shown in separated relation prior to the performance of the step.

Figure 8 is a view of the seal of Figure 7 on a larger scale, in perspective, associated with an object to be sealed;

Figure 9 is a view of the seal of Figure 8 after compression;

Figure 10 is a cross-section taken on the line 10—10 of Figure 6 on a larger scale;

Figure 11 is a cross-section taken on the line 11—11 of Figure 1 on a larger scale; and Figure 12 is a cross-section taken on the line 12—12 of Figure 2 on a larger scale.

Figure 1:
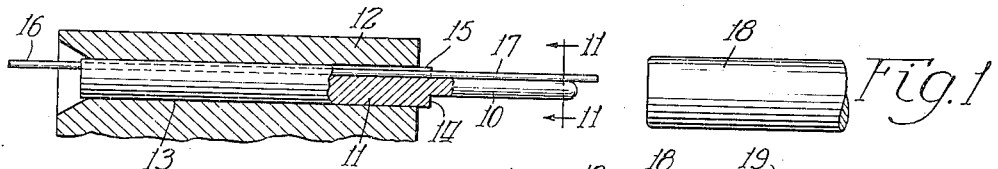

Referring in detail to the figures of the drawings, I have shown a pin-like mandrel 10 having an enlarged shank 11 by which the mandrel is supported by any suitable holder 12 having, in this instance, a bore 13 receiving the cylindrical shank 11 of the mandrel with the shoulder 14 between the shank and the mandrel proper, and the mandrel itself, projected from the holder 12. As best shown in Figures 1 and 11, the shank 11 of the mandrel is provided with a longitudinally extending slot 15 through which a flexible element for my improved seal, represented in this instance by the solid wire 16, is passed. The wire 16 may be cut off, by any suitable means not here shown, to appropriate length for purposes of the seal and one end 17 of the wire may be pushed through the slot 15 to lie alongside of and initially parallel with the mandrel 10. It will be understood that the expedients just described are merely one illustrative means of holding the wire and mandrel in this initial relationship, and that substantially the same result could be accomplished by hand.

Figure 2:
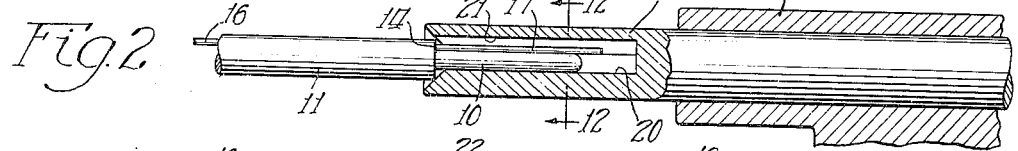
Figure 2 shows a view of the expedients of Figure 1 in cooperative relationship, other parts being shown in section.
Figure 3:
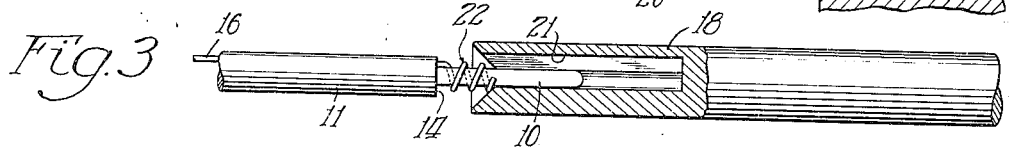
Figure 3 is a similar view, partly in section, but subsequent to the performance of a succeeding step.

First maintaining the wire and mandrel in the described initial relationship, I next proceed to loop the end 17 of the wire about the mandrel. While this might be accomplished by hand, I have illustrated one practical expedient or aid to accomplish this next step in my process, here represented by the sleeve 18 which may carry any suitable handle element to readily effect rotation of the sleeve, a fragment of which is shown in cross-section and indicated by the numeral 19. As here shown, the sleeve 18 is recessed or bored as at 20 cylindrically to snugly receive the mandrel 10 which is also desirably cylindrical. To receive the wire also when the mandrel and wire are associated as shown, the bore 20 of the sleeve 18 is enlarged radially and axially as at 21 and as best shown in Figures 2 and 12. Thus by slipping the sleeve 18 over the wire and mandrel with the wire located in the slot 21, and then rotating the sleeve, while holding the mandrel against rotation, the end 17 of the wire will be caused to loop about the mandrel as indicated in Figure 3. To assist in locating the wire in the slot 21 I may advantageously project the extreme end of the wire slightly beyond the mandrel as shown in Figures 1 and 2. Furthermore, by withdrawing the sleeve from the mandrel during the rotation of the sleeve, I may dispose the end of the wire in a plurality of helical turns 22 where looped about the mandrel.

Figure 4:
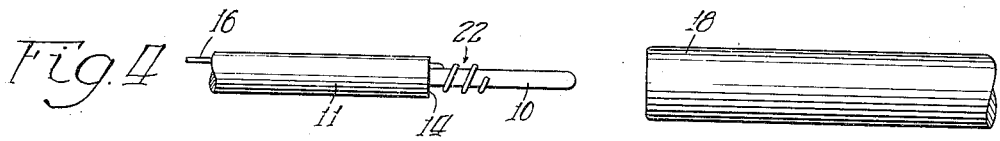
Figure 4 shows the results of the performance of the steps indicated by the previous figures.
Figure 5:
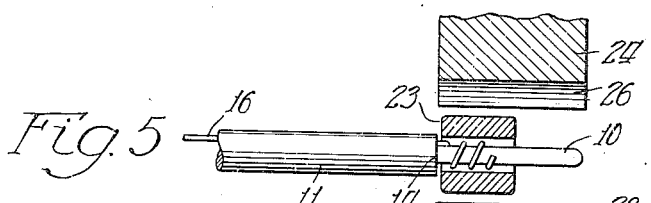
Figure 5 shows the introduction of a malleable member of the seal, shown in section, and one means, also shown in section, for forming the malleable member in accordance with the invention.
Figure 6:
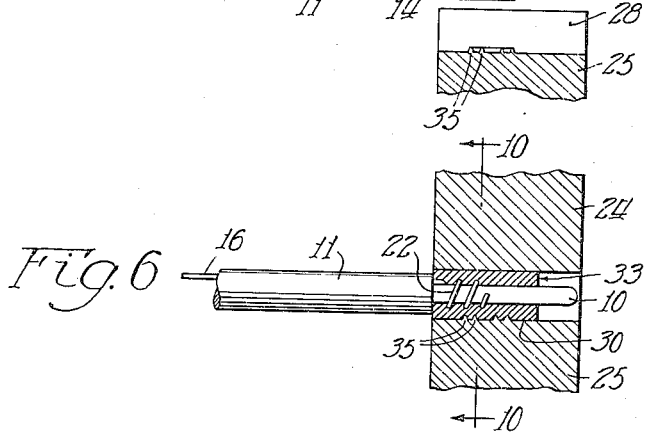
Figure 6 shows a preferred operation on the malleable member in accordance with my invention.

After withdrawing the sleeve 18, as shown in Figure 4, I next proceed to associate the sealing member of my improved seal with the flexible member or wire, this sealing member being here represented by the cylindrical slug 23 desirably composed of a malleable or relatively soft metal such as lead. As shown in Figure 5, I slip the slug 23 over the mandrel and turns 22 of the wire, the shoulder 14 on the mandrel assisting in locating the slug over the turns of the wire, this shoulder having of course previously assisted in forming the first turn of the wire relatively close to the shoulder 14. With the mandrel, wire and slug held in this relationship, I next proceed to form the slug about the wire and mandrel. While this might be done by hand, I advantageously provide compressing expedients such as the complementary jaws 24, 25 between which the mandrel, wire and slug are inserted and which are relatively movable with respect to the mandrel as shown in Figures 6 and 10, so as to compress the slug 23 transversely while permitting it to expand longitudinally.

Figure 7:
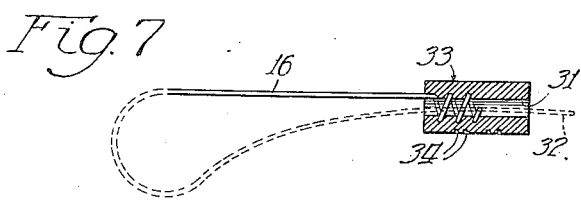
Figure 7 shows a completed seal made by the performance of the steps indicated by the previous figures, the malleable member of the seal being shown in section and the flexible member partly in full and partly in broken lines, indicating one relationship of parts.

As best shown in Figure 10, the jaws 24, 25 are desirably somewhat male-and-female, the upper or male jaw 24 being recessed semi-cylindrically as at 26 to form the semi-cylindrical portion 27 of the lead, the lower or female jaw 25 having the more generally rectilinear recess 28 forming the somewhat flattened portion 29 of the lead and more particularly the generally flat surface 30 thereon. Upon compression of the lead as just described, with the mandrel and wire remaining in the relationship shown, the mandrel maintains the helical disposition of the wire while at the same time causing the wire to be imbedded in the lead, which is forced by the jaws between the turns of the wire and into contact with the mandrel except where the wire intervenes as best shown in Figure 6. Thus when the mandrel is withdrawn, as shown in Figure 7, the next step in my process, a bore 31 is left in the lead, with the turns 22 of the wire looped about the walls of the bore 31 and securely anchored in the lead, with the opposite end 32 of the wire 16 initially free, so that the wire may be bent upon itself and the end 32 freely moved through the bore 31 of the lead, for the purpose presently to be described.

At some stage in the formation of the sealing member to its intermediate stage as indicated by the numeral 33, in accordance with another aspect of my invention, I provide the intermediate sealing member 33 with an identifying mark or marks desirably in the nature of a figure formed by a groove or grooves depressed below the normal surface of the lead. Such a figure is here represented by the concentric circular grooves 34 formed in the flat surface 30 of the lead when in its intermediate stage 33. This figure may be readily formed during the compression step shown in Figures 6 and 10 by providing one of the jaws, as here shown the female jaw 25, with embossments 35 in the shape of two concentric circles, these embossments, after compression of the parts, leaving the concentric grooves 34 in the lead.

It will be understood that the intermediate sealing member 33 might be formed as just described from a solid but plastic or malleable slug 23, or might even be formed by casting (in a molten state) the lead or the like initially about the associated mandrel and wire shown in the step of Figure 4.

In the next aspect of my invention, the seal is ready to be applied to a meter or the like to prevent unapprehensible access to the meter. In accordance with common practice, certain relatively movable portions of the meter housing necessary to be moved to obtain access thereto such as the hasps 36, 37 having apertures 38 therein, have the wire 16 passed therethrough, as indicated in Figure 8. This may be done at the central office, or more frequently, by an authorized inspector upon the premises of the customer where the meter is located. After an inspection, for example, the inspector wishes to seal the meter until the next authorized inspection, and having passed the wire 16 thru the holes 38 in each of the hasps 36, 37 he then passes the free end 32 of the wire through the bore 31 in the lead in its intermediate form 33.

Using a conventional compression tool (not necessary to be shown) which he carries with him, the inspector then compresses the lead from its intermediate form 33 to its flattened and final form 39, shown in Fig. 9. This compression having taken place in a direction normal to the face 30 of the lead, and the lead being expansible in the plane of said face, and the face 30 having expanded as shown in Fig. 9 in the direction of the arrows 40, the concentric circles 34 have now become the concentric somewhat elliptical figures 41. The lead naturally expands in this direction more than in the other, due to the collapsing of bore 31. The compression tool of the inspector also does of course permit expansion of the face 30 for instance in one direction, as here indicated by arrows 40, but tends to restrict expansion of said face in the transverse directions for instance as here indicated by the arrows 42, thus preventing the circles 34 from taking a merely larger circular form, and definitely changing the form of the figure from the circles shown in Fig. 8 to the ellipses or the like shown in Fig. 9. The compression tool of the inspector also customarily embosses on the lead a second figure such as the figures 43, which may be the initials or number of the inspector or might be the initials of the service company owning the meter.

Upon compression of the sealing member in the intermediate stage 33, to its final sealing stage 39, as shown in Fig. 9, the bore 31 in the lead is substantially entirely closed and not only the initially anchored end 17 of the wire but now also the previously free end 32 of the wire, are both securely imbedded in the lead. Preferably the extremity of the free end 32 projects entirely through the lead as indicated in Fig. 9. As so imbedded the two wires are now not only permanently anchored in the lead, but are intimately interlocked, the end 32 intersecting contactually the turns 22 of the wire at a number of points corresponding to twice the number of turns of the wire. In any event, the two wires are desirably intersecting and interlocking at at least one point, that is the juxtaposed portions of the two ends of the wire are disposed transversely one with respect to the other, as in this instance by one or more of the turns 22, so as to form, when the parts are compressed, interlocking shoulders, as will be readily understood from Figure 7.

Thus my improved seal, as so made, not only cannot be removed and replaced without being broken, but is practically impossible of imitation so as to be broken and removed and replaced by a simulating seal, without detection. In other words, while it has been known to provide seals of peculiar identifying configuration, such as making the entire lead member in the form of a cross or a star, for example, such conspicuously characteristic configurations for the entire lead member are readily perceived by the would-be imitators to be distinctive and for purposes of identification, and are therefore closely imitated by anyone seeking unauthorized access to the meter and willing to destroy the first seal and replace it with another like it.

In accordance with my invention, in contrast, the identifying mark is substantially inconspicuous or is thought by the casual observer to be accidental or merely ornamental and not necessary of imitation, when attempting to duplicate the seal.

I contemplate as a suitable identifying mark for my purpose any geometrical figure or the like, that is, a figure having a definitely alterable appearance, preferably depressed below the surface, or even raised thereabove. For example, a line or series of parallel lines would not be generally suitable since the mere increase in the length of a line would not be a sufficient alteration in appearance to serve my purpose.

Furthermore, when the identifying mark in its intermediate stage is in the form of a circle, for example, as here shown, and this circle becomes an ellipse or the like in its final form, a would-be imitator of the seal would not know without considerable experiment, how to produce the ellipse, and would not readily perceive that it had been produced by making the original figure a circle. In any event, he would not know the size of the original circle, without having seen the lead in its intermediate stage 33, even though the face 30 were permitted to expand equally in the directions both of the arrows 40 and 42. Moreover, by causing the figures 43 embossed on the lead by the inspector's compression tool to be superposed or intersecting with the figures 41, the identifying marks 41 are rendered still less conspicuous and unlikely to be imitated by anyone attempting to tamper with the seal.

Obviously, the invention is not limited to the details form and sequence of steps of operation described above for purposes of illustration.

Such changes may be made as fall within the scope of the following claims, as limited by the prior art, without departing from the invention.

Furthermore, it is not essential that all features of the invention be used conjointly, as various combinations and sub-combinations might be advantageously employed.

Having described my invention, I claim:

1. As an article of manufacture, a tamper-proof seal including a soft metal member having in initial form an identifying figure upon a face thereof formed by a groove depressed below the normal surface of said face, the member being readily expansible in the plane of said face by compression in a direction normal to said face whereby the figure remains visible but altered in size or configuration after compression.

2. As an article of manufacture, a tamper-proof seal including a soft metal member having in its iniitial form an identifying figure upon a face thereof formed by a groove depressed below the normal surface of said face the member being thereafter expanded in the plane of said face by compression in a direction normal to said face over an area materially greater than the figure, the figure remaining visible but altered in configuration after compression, and a second identifying figure upon said face formed by said compression of the member.

3. The structure of claim 2 wherein the second figure intersects the first mentioned figure.

4. The structure of claim 2 wherein the first-mentioned figure is formed initially by a substantially circular groove, said figure having the form substantially of an ellipse after the compression of the member and expansion of said face.

5. The method of providing tamper-proof seals or the like which comprises providing a malleable member having a surface with a character thereon depressed below the plane of said surface and then compressing the member in a direction transverse to said surface over an area materially greater than said character to alter the form of said character but without substantially defacing the character.

6. The method of providing tamper-proof seals or the like which comprises providing a malleable member having a surface with a character thereon having a face spaced to one side of the plane of said surface and partially deforming the member over an area materially greater than said character while expanding the member materially more in one transverse direction than another whereby to alter the form of the character without obliterating it.

RALPH S. PEIRCE.